United States Patent [19]
Enzetti

[11] 3,722,104
[45] Mar. 27, 1973

[54] FALSE FINGERNAIL CLASSIFIER

[76] Inventor: Eugenio Enzetti, Calle Laguna No. 923, Buenos Aires, Argentina

[22] Filed: June 1, 1971

[21] Appl. No.: 148,629

[30]     Foreign Application Priority Data

Dec. 1, 1970   Argentina..............................232729

[52] U.S. Cl...................................33/174 D, 132/73
[51] Int. Cl..........G01b 3/04, G01b 3/14, G01b 5/20
[58] Field of Search............33/174 B, 174 D, 174 K; 132/73, 88.5

[56]           References Cited

UNITED STATES PATENTS

2,272,967   2/1942   Desmond............................33/174 K

Primary Examiner—Leonard Forman
Assistant Examiner—Paul G. Foldes
Attorney—Molinare, Allegretti, Newitt & Witcoff

[57]           ABSTRACT

The present invention relates to a gauge for measuring and classifying a fingernail to which a false nail is to be applied.

5 Claims, 5 Drawing Figures

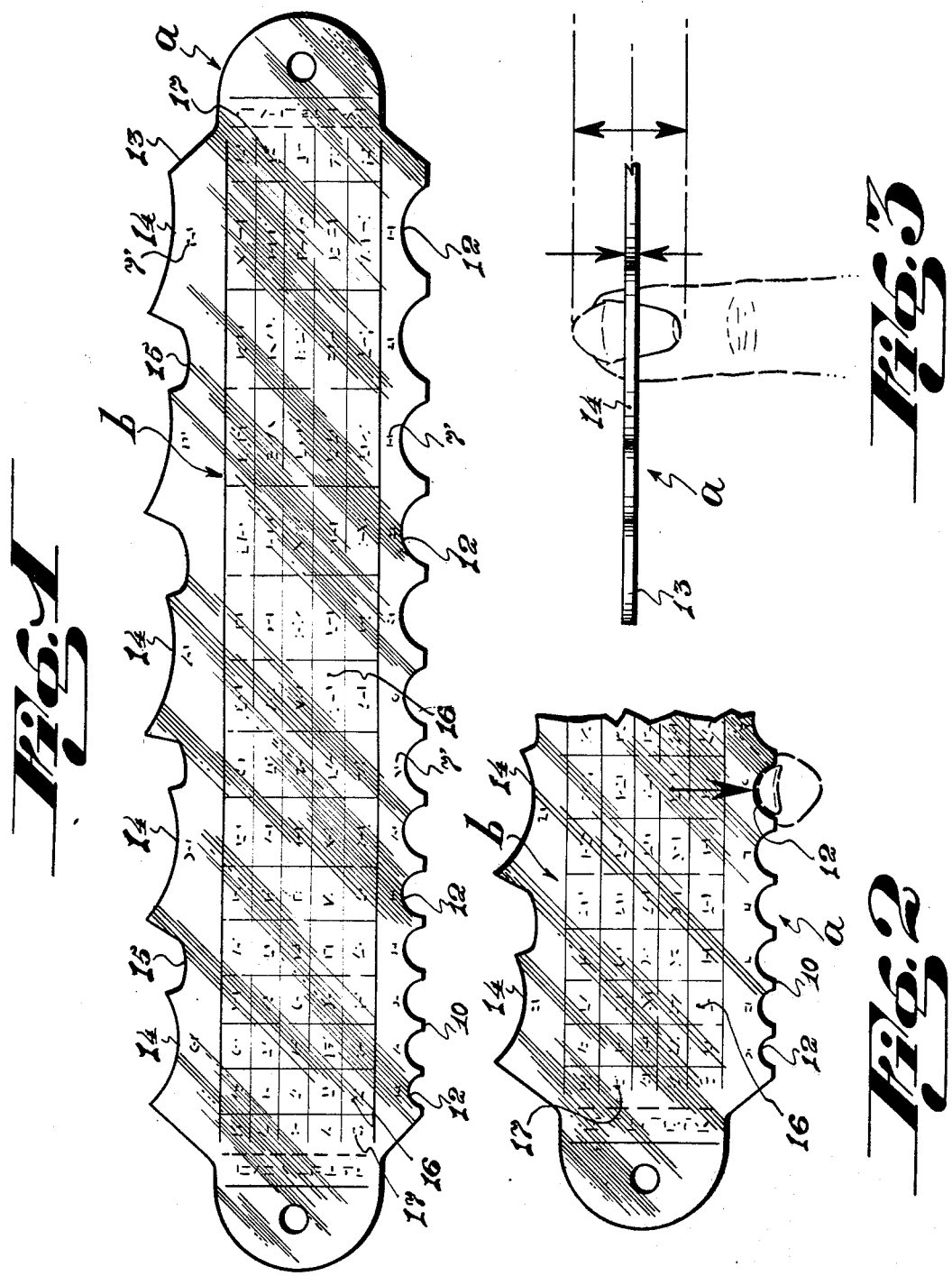

PATENTED MAR 27 1973

INVENTOR
EUGENIO ENZETTI

BY MOLINARE, ALLEGRETTI, NEWITT & WITCOFF
ATTORNEY

FALSE FINGERNAIL CLASSIFIER

BACKGROUND OF THE INVENTION

It is well known that false nails are made from curvilinear laminar bodies with the cavity or mating face provided with an adhesive. The adhesive backed nails require for a perfect adaptation, that the cavity or mating face correspond as nearly as possible to the nail over which it is applied. When the cavity or mating face and the fingernail do not correspond, the setting of the false nail is irregular and the false nail can become easily unfastened in an involuntary manner.

A solution to this problem has been that of manufacturing false fingernails to measure, that is, on individual molds made on the fingers of the user. This process, apart from being expensive and troublesome, defeats the possibility of producing false nails in standard sizes on a production basis.

To avoid this costly, personalized production, manufacturers have turned to standard sizes of false nails. These generally come in assorted sizes, ie: small, medium and large. The user must guess or estimate which size false nail will fit which fingernail. The selection is strictly by trial and error. There is no assurance the false nail selected will fit the nail to which it is to be applied. The manufacture of many additional standard size nails would only confuse the already tedious trial and error prior art method of selecting mass produced, standardized false fingernails.

It is therefore desirable to have some means of measuring and classifying fingernails so as to assure a proper fitting false nail.

SUMMARY OF THE INVENTION

A false fingernail classifying gauge comprising a substantially planar rigid member having first and second edges wherein the first edge has a scale of curvilinearly shaped indentions. The indentions on the first scale correspond substantially to various transverse profiles of fingernails to be measured. The second edge of the gauge also has a scale of indentions. This second scale of curvilinearly shaped indentions correspond to various longitudinal profiles of fingernails to be measured. Means are provided for correlating the first and second scale measurements to identify the size of a false fingernail that will fit a fingernail from which the first and second scale measurements were taken.

An object of this invention then is to provide an apparatus for measuring the profiles of fingernails.

A further object of this invention is to provide classifying means for correlating the results of the measured fingernail profiles.

A further object of this invention is to provide a gauge comprised of a simple integral piece having at least, on two borders, measuring means defining the longitudinal and transverse profiles of a fingernail, the correlation of which identifies a false nail. Preferably, the gauge has, at least on one of its faces, a combination table to correlate the measurements so as to select the appropriate false nail to be applied to the measured fingernail.

Further objects, advantages and characteristics of the invention will be set forth in the following specification which, for greater clearness and comprehension, has been illustrated with several drawings which represent a preferred embodiment of the classifying gauge.

BRIEF DESCRIPTION OF THE DRAWING

In the detailed description which follows, reference will be made to the drawing comprised of the following figures:

FIG. 1 is a plan view of the classifying gauge for false fingernails;

FIG. 2 is a partial plan view showing the application of the gauge transversely to the middle potion of the nail, thereby determining the transverse profile of the nail to be classified;

FIG. 3 is a partial side view corresponding to FIG. 2 illustrating the transverse application zone of the gauge;

DETAILED DESCRIPTION OF THE PREFERRED EMBODIMENT

Figure 4:
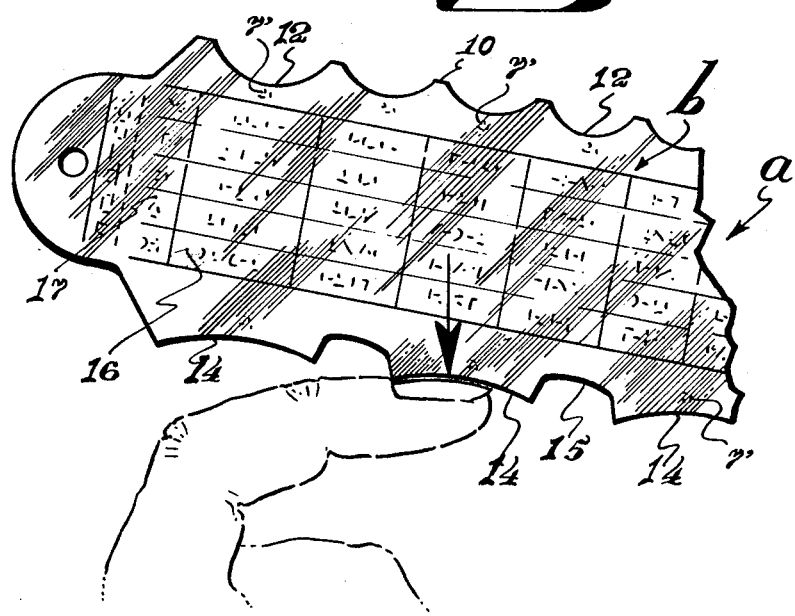
FIG. 4 is a partial plan view similar to that of FIG. 2 showing the application of the gauge longitudinally to the middle portion of the nail thereby determining the longitudinal profile of the nail to be classified.
Figure 5:
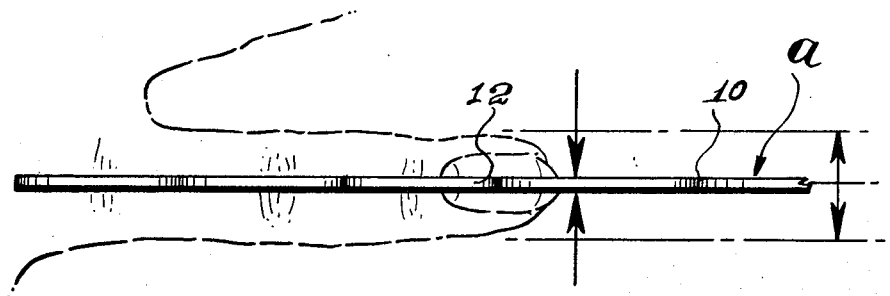
FIG. 5 is a lateral view similar to that of FIG. 3 illustrating the longitudinal application zone of the gauge.

In the different Figures, equal or equivalent parts are identified by similar reference characters.

As may be seen in the drawings, the classifying gauge for false fingernails of this invention, comprises an integral member *a* which, preferably, is substantially planar, and substantially rigid. One of its borders 10 comprises a first scale having a plurality of curvilinear shaped indentions 12 which are used to determine the different transverse profiles along the transverse center axis of the fingernail to be measured or classified.

On the other border 13, opposite to that already mentioned, a second scale is located. This second scale has a plurality of indentions 14. Indentions 14 are also curvilinear though they are more elongated and are of a greater curvature than indentions 12. Indentions 14 correspond to the different profiles along the longitudinal center axis of the nails to be measured or classified.

Given the particular classification form of the longitudinal profiles and in order to avoid contact with the surface of the nail which may not correspond to the contour of indention 14, said indentions 14 are somewhat inclined with respect to the original border line 13 and are separated by means of the openings 15.

On at least one of the faces of the integral member *a* is impressed or engraved a combination table *b*. The longitudinal columns 16 of table *b* correspond to the values indicated for each indention 12 of the transversal profile, while the vertical columns 17 list values corresponding to the curvature of the longitudinal profile of indentions 14. Each of the indentions carry indicia or identification numbers 7' as shown in FIG. 4.

The designation of the false nail corresponding to any particular set of contour values may be found in table *b* where column 16 meets column 17.

As shown and illustrated, the invention, constituting a fingernail gauge admits a great number of combinations, as they are based on their respective scales of transversal profile indentions 12 and longitudinal profile indentions 14. Through the use of the present invention the profile numbers can be applied as one wishes, thus obtaining a false nail cover for all possible fingernail shapes and contours.

Undoubtedly, when using said invention modifications may arise as to certain details. Details of the numerous features of the invention may be altered without a departure from the fundamental principles which are clearly specified in the following claims.

I claim:

1. A false fingernail classifying gauge comprising a substantially planar, rigid member having first and second edges, said first edge having a first scale including a plurality of curvilinearly shaped indentions thereon, each one of said first scale indentions corresponding substantially to a different transverse profile of a fingernail, said second edge having a second scale including a plurality of elongated curvilinearly shaped indentions thereon, each one of said second scale of indentions corresponding substantially to a different longitudinal profile of a fingernail, and means for correlating said first and second indentions to identify the size of a false fingernail that will fit a fingernail from which measurements are taken on said first and second scales.

2. A false fingernail classifying gauge as described in claim 1 wherein said means for correlating said first and second indentions comprises a table, said table having horizontal and vertical columns which correspond to the respective indention scales, the corresponding point where said horizontal and vertical columns meet determining the classification of the false nail.

3. Tabular correlating means as described in claim 2 wherein said table is inscribed on a face of said substantially planar rigid member.

4. Tabular correlating means as described in claim 2 wherein different indicia on said table are associated with each indention on said gauge.

5. A false fingernail classifying gauge as described in claim 1 wherein said second scale of elongated curvilinearly shaped indentions are inclined with respect to said second edge, said elongated curvilinearly shaped inclined indentions being separated by such that when said nail contacts the corresponding one of said indentations, contact between the nail and an adjacent one of said indentations may be avoided.

* * * * *